(12) United States Patent
Je et al.

(10) Patent No.: US 11,157,813 B1
(45) Date of Patent: Oct. 26, 2021

(54) METHOD AND DEVICE FOR ON-VEHICLE ACTIVE LEARNING TO BE USED FOR TRAINING PERCEPTION NETWORK OF AUTONOMOUS VEHICLE

(71) Applicant: Stradvision, Inc., Pohang-si (KR)

(72) Inventors: Hongmo Je, Pohang-si (KR); Bongnam Kang, Pohang-si (KR); Yongjoong Kim, Pohang-si (KR); Sung An Gweon, Seoul (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 17/204,287

(22) Filed: Mar. 17, 2021

Related U.S. Application Data

(60) Provisional application No. 63/014,877, filed on Apr. 24, 2020.

(51) Int. Cl.
*G06N 3/08* (2006.01)
*G06N 3/04* (2006.01)
*G05D 1/02* (2020.01)

(52) U.S. Cl.
CPC ............... *G06N 3/08* (2013.01); *G06N 3/04* (2013.01); *G05D 1/0231* (2013.01)

(58) Field of Classification Search
CPC ........... G06N 3/08; G06N 3/04; G05D 1/0231
USPC .......................................................... 706/20
See application file for complete search history.

(56) References Cited

U.S. PATENT DOCUMENTS

| 2019/0035128 A1* | 1/2019 | Russell ............ G08B 13/19686 |
| 2020/0033880 A1* | 1/2020 | Kehl ........................ G06T 7/10 |
| 2020/0081435 A1* | 3/2020 | Chen ..................... G05D 1/0088 |
| 2020/0311961 A1* | 10/2020 | Morinaga ................ G06T 7/10 |
| 2021/0001858 A1* | 1/2021 | Kang ................... G06N 3/0445 |
| 2021/0027103 A1* | 1/2021 | Brower .................... G06N 3/08 |
| 2021/0133497 A1* | 5/2021 | Faller .................. G08G 1/0125 |
| 2021/0133988 A1* | 5/2021 | Nater ................. G06K 9/00201 |
| 2021/0142069 A1* | 5/2021 | Chen .................... G06F 16/9027 |
| 2021/0142168 A1* | 5/2021 | Kushnir ............... G06N 3/0454 |

* cited by examiner

*Primary Examiner* — Jerome Grant, II
(74) *Attorney, Agent, or Firm* — Taft Stettinius & Hollister LLP

(57) ABSTRACT

A method of on-vehicle active learning for training a perception network of an autonomous vehicle is provided. The method includes steps of: an on-vehicle active learning device, (a) if a driving video and sensing information are acquired from a camera and sensors on an autonomous vehicle, inputting frames of the driving video and the sensing information into a scene code assigning module to generate scene codes including information on scenes in the frames and on driving events; and (b) at least one of selecting a part of the frames, whose object detection information satisfies a condition, as specific frames by using the scene codes and the object detection information and selecting a part of the frames, matching a training policy, as the specific frames by using the scene codes and the object detection information, and storing the specific frames and specific scene codes in a frame storing part.

16 Claims, 5 Drawing Sheets

METHOD AND DEVICE FOR ON-VEHICLE ACTIVE LEARNING TO BE USED FOR TRAINING PERCEPTION NETWORK OF AUTONOMOUS VEHICLE

CROSS REFERENCE TO RELATED APPLICATION

This application claims the benefit of priority to U.S. Provisional Patent Application No. 63/014,877, filed on Apr. 24, 2020, the entire contents of which being incorporated herein by reference.

FIELD OF THE DISCLOSURE

The present disclosure relates to a method for on-vehicle active learning to be used for training a perception network of an autonomous vehicle; and more particularly, to the method for selecting training data, to be used for training the perception network, from real-time data of the autonomous vehicle, and for training the perception network with the selected training data, and an on-vehicle active learning device using the same.

BACKGROUND OF THE DISCLOSURE

Recently, researches has been conducted on methods of identifying objects via machine learning technologies.

As one of the machine learning technologies, deep learning, which uses a neural network including multiple hidden layers between an input layer and an output layer, has high performance on the object identification.

And, the neural network is generally trained via back-propagation using one or more losses.

Conventionally, in order to train a deep learning network, raw data were collected according to a data collection policy, and then human labelers perform annotation on the raw data, to thereby generate new training data. Thereafter, by using the new training data and existing training data, the deep learning network is trained, and then, by referring to a result of analysis conducted by human engineers, a training algorithm for the deep learning network is revised and improved. Moreover, by referring to the result of the analysis, the data collection policy and incorrect annotations are revised.

However, as a performance of the deep learning network is improved, hard examples useful for training become scarce in such conventional methods. Accordingly, an efficiency of training the deep learning network with new training data becomes less productive, and, therefore, a return on investment from a data annotation performed by the human labelers is reduced.

Meanwhile, the autonomous vehicle is a vehicle driven without any action of a driver in response to driving information and driving environments of the vehicle, and uses a perception network based on deep learning in order to detect driving environment information, e.g., objects, lanes, traffic signal, etc. near the vehicle.

Such an autonomous vehicle requires online learning, that is, training with the perception network installed, in order to update the perception network. However, since a storage capacity of an embedded system for the autonomous vehicle is limited, the autonomous vehicle must perform data sampling on a database, e.g., cloud storage, in which the training data are stored in order to acquire some part of the training data and update the perception network using said some part of the training data.

Conventionally, sampling methods, such as a random sampling method, metadata sampling method and manual curation sampling method, etc. have been used for performing the data sampling. However, such sampling methods are inappropriate for an on-vehicle active learning since such sampling methods must store all data under offline condition in order to perform the active learning.

SUMMARY OF THE DISCLOSURE

It is an object of the present disclosure to solve all the aforementioned problems.

It is another object of the present disclosure to provide a method for allowing on-line active learning.

It is still another object of the present disclosure to provide a method for improving an efficiency of training a perception network with new training data.

It is still yet another object of the present disclosure to provide a method for performing on-vehicle learning of the perception network of an autonomous vehicle.

In accordance with one aspect of the present disclosure, there is provided a method for on-vehicle active learning to be used for training a perception network of an autonomous vehicle, including steps of: (a) an on-vehicle active learning device, if a driving video and sensing information are acquired respectively from a camera and one or more sensors mounted on an autonomous vehicle while the autonomous vehicle is driven, performing or supporting another device to perform a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information; and (b) the on-vehicle active learning device performing or supporting another device to perform at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another.

As one example, the method further includes a step of: (c) the on-vehicle active learning device performing or supporting another device to perform (c1) a process of sampling the specific frames stored in the frame storing part by using the specific scene codes to thereby generate training data and (c2) a process of executing on-vehicle learning of the perception network of the autonomous vehicle by using the training data.

As one example, at the step of (c), the on-vehicle active learning device performs or supports another device to perform at least one of (i) a process of under-sampling the specific frames by referring to the scene codes or a process of over-sampling the specific frames by referring to the scene codes, to thereby generate the training data and thus train the perception network, at the step of (c1) and (ii) (ii-1) a process of calculating one or more weight-balanced losses on the training data, corresponding to the scene codes, by weight balancing and (ii-2) a process of training the perception network via backpropagation using the weight-balanced losses, at the step of (c2).

As one example, at the step of (a), the on-vehicle active learning device performs or supports another device to perform a process of allowing the scene code assigning module to (i) apply a learning operation to each of the frames, to thereby classify each of the scenes of each of the frames into one of classes of driving environments and one of classes of driving roads and thus generate each of class codes of each of the frames, via a scene classifier based on deep learning, (ii) detect each of driving events, which occurs while the autonomous vehicle is driven, by referring to each of the frames and each piece of the sensing information on each of the frames, to thereby generate each of event codes, via a driving event detecting module, and (iii) generate each of the scene codes for each of the frames by using each of the class codes of each of the frames and each of the event codes of each of the frames.

As one example, the on-vehicle active learning device performs or supports another device to perform a process of allowing the scene code assigning module to (i) detect one or more scene changes in the frames via the driving event detecting module and thus generate one or more frame-based event codes and (ii) detect one or more operation states, corresponding to the sensing information, of the autonomous vehicle and thus generate one or more vehicle-based event codes, to thereby generate the event codes.

As one example, at the step of (b), the on-vehicle active learning device performs or supports another device to perform a process of selecting a certain frame, on which no object is detected from its collision area, corresponding to a collision event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

As one example, at the step of (b), the on-vehicle active learning device performs or supports another device to perform a process of selecting a certain frame, on which an object is detected from its collision area, corresponding to a normal event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

As one example, at the step of (b), the on-vehicle active learning device performs or supports another device to perform a process of selecting a certain frame where an object, with its confidence score included in the object detection information equal to or lower than a preset value, is located as one of the specific frames.

As one example, at the step of (b), the on-vehicle active learning device performs or supports another device to perform a process of selecting a certain frame, from which a pedestrian in a rare driving environment is detected, as one of the specific frames, by referring to the scene codes.

In accordance with another aspect of the present disclosure, there is provided an on-vehicle active learning device for on-vehicle active learning to be used for training a perception network of an autonomous vehicle, including: at least one memory that stores instructions; and at least one processor configured to execute the instructions to perform or support another device to perform: (I) if a driving video and sensing information are acquired respectively from a camera and one or more sensors mounted on an autonomous vehicle while the autonomous vehicle is driven, a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information and (II) at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another.

As one example, the processor further performs or supports another device to perform: (III) (III-1) a process of sampling the specific frames stored in the frame storing part by using the specific scene codes to thereby generate training data and (III-2) a process of executing on-vehicle learning of the perception network of the autonomous vehicle by using the training data.

As one example, at the process of (III), the processor performs or supports another device to perform at least one of (i) a process of under-sampling the specific frames by referring to the scene codes or a process of over-sampling the specific frames by referring to the scene codes, to thereby generate the training data and thus train the perception network, at the process of (III-1) and (ii) (ii-1) a process of calculating one or more weight-balanced losses on the training data, corresponding to the scene codes, by weight balancing and (ii-2) a process of training the perception network via backpropagation using the weight-balanced losses, at the process of (III-2).

As one example, at the process of (I), the processor performs or supports another device to perform a process of allowing the scene code assigning module to (i) apply a learning operation to each of the frames, to thereby classify each of the scenes of each of the frames into one of classes of driving environments and one of classes of driving roads and thus generate each of class codes of each of the frames, via a scene classifier based on deep learning, (ii) detect each of driving events, which occurs while the autonomous vehicle is driven, by referring to each of the frames and each piece of the sensing information on each of the frames, to thereby generate each of event codes, via a driving event detecting module, and (iii) generate each of the scene codes for each of the frames by using each of the class codes of each of the frames and each of the event codes of each of the frames.

As one example, the processor performs or supports another device to perform a process of allowing the scene code assigning module to (i) detect one or more scene changes in the frames via the driving event detecting module and thus generate one or more frame-based event codes and (ii) detect one or more operation states, corresponding to the sensing information, of the autonomous vehicle and thus generate one or more vehicle-based event codes, to thereby generate the event codes.

As one example, at the process of (II), the processor performs or supports another device to perform a process of selecting a certain frame, on which no object is detected from its collision area, corresponding to a collision event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

As one example, at the process of (II), the processor performs or supports another device to perform a process of selecting a certain frame, on which an object is detected from its collision area, corresponding to a normal event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

As one example, at the process of (II), the processor performs or supports another device to perform a process of selecting a certain frame where an object, with its confidence score included in the object detection information equal to or lower than a preset value, is located as one of the specific frames.

As one example, at the process of (II), the processor performs or supports another device to perform a process of selecting a certain frame, from which a pedestrian in a rare driving environment is detected, as one of the specific frames, by referring to the scene codes.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
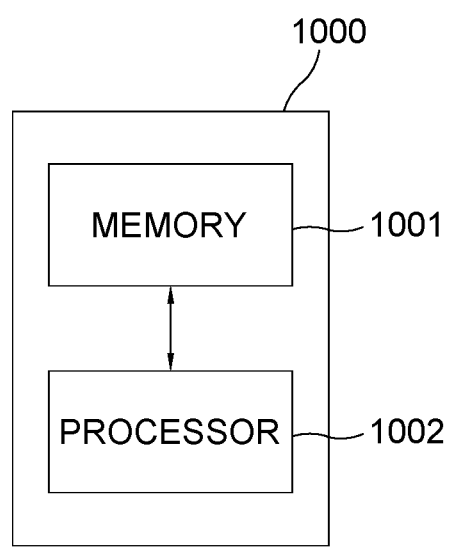
FIG. 1 is a drawing schematically illustrating an on-vehicle active learning device for on-vehicle active learning to be used for training a perception network of an autonomous vehicle in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

To allow those skilled in the art to carry out the present disclosure easily, the example embodiments of the present disclosure by referring to attached diagrams will be explained in detail as shown below.

FIG. 1 is a drawing schematically illustrating an on-vehicle active learning device for on-vehicle active learning, to be used for training a perception network of an autonomous vehicle, in accordance with one example embodiment of the present disclosure. By referring to FIG. 1, the on-vehicle active learning device 1000 may include a memory 1001 which stores one or more instructions for performing the on-vehicle active learning of one or more consecutive frames in a driving video acquired from the autonomous vehicle, and a processor 1002 which performs functions for the on-vehicle active learning in response to the instructions stored in the memory 1001.

Specifically, the basic learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Figure 2:
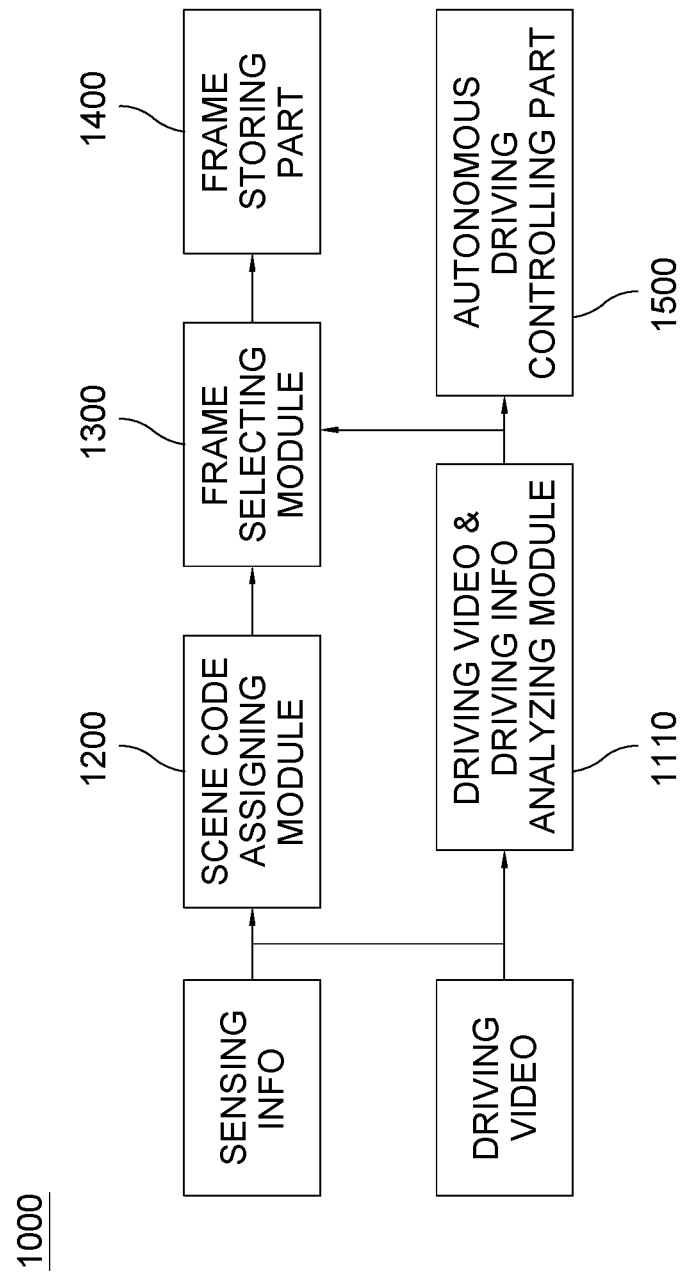
FIG. 2 is a drawing schematically illustrating a method for the on-vehicle active learning in accordance with one example embodiment of the present disclosure.

Meanwhile, a method for using the on-vehicle active learning device 1000 for the on-vehicle active learning, to be used for training the perception network of the autonomous vehicle, is explained below by referring to FIG. 2 in accordance with one example embodiment of the present disclosure.

First, if the driving video and sensing information are acquired respectively from a camera, e.g., an image sensor, and one or more sensors mounted on the autonomous vehicle while the autonomous vehicle is driven, the on-vehicle active learning device 1000 may perform or support another device to perform a process of inputting one or more consecutive frames of the driving video and the sensing information into a scene code assigning module 1200, to thereby allow the scene code assigning module 1200 to generate each of one or more scene codes including information on each of scenes in each of the frames and information on one or more driving events by referring to the frames and the sensing information.

Herein, each of the scene codes may be created by encoding, e.g., codifying, information on each of the scenes of each of the frames and information on the driving events.

Figure 3:
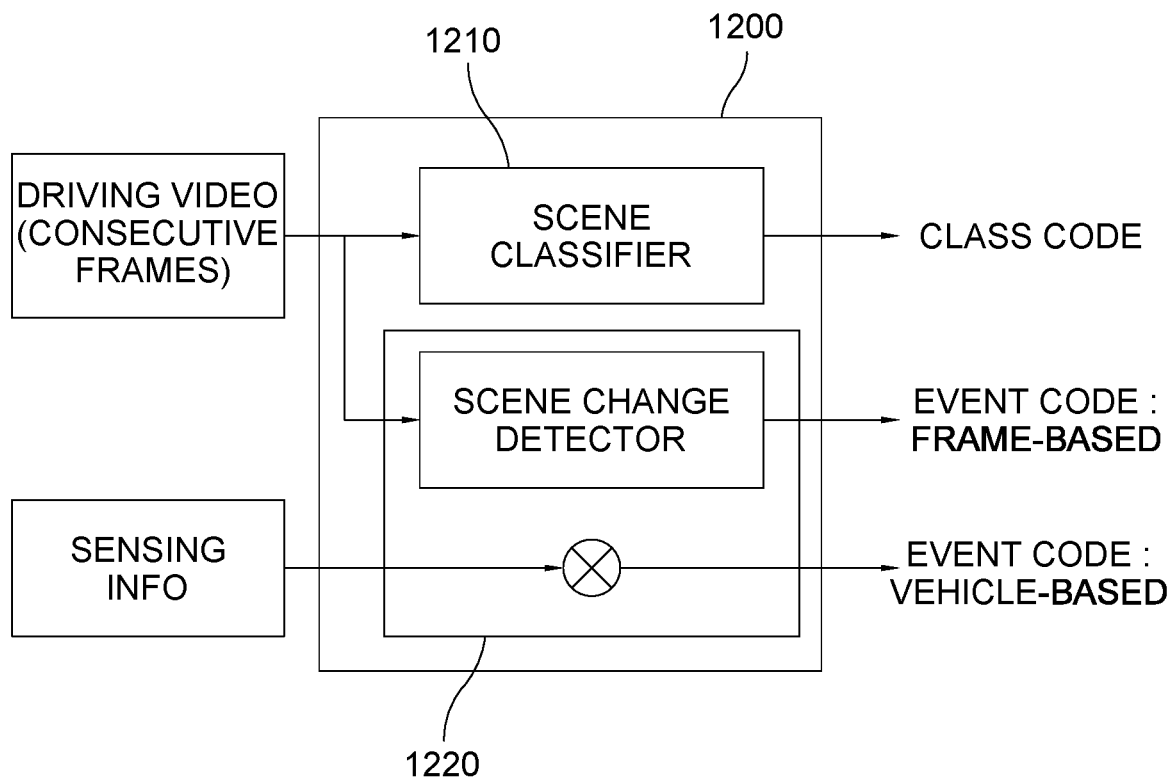
FIG. 3 is a drawing schematically illustrating a method for generating a scene code during processes of the on-vehicle active learning in accordance with one example embodiment of the present disclosure.

For example, by referring to FIG. 3, the scene code assigning module 1200 may perform or support another device to perform a process of applying a learning operation to each of the frames and thus classifying each of the scenes of each of the frames into one of preset classes of driving environments and one of preset classes of driving roads, to thereby generate each of class codes of each of the frames, via a scene classifier 1210 based on deep learning. That is, the scene classifier 1210 may extract features of each of the frames and classify the extracted features into one of the classes of the driving environments and one of the classes of the driving roads, to thereby generate each of the class codes of each of the frames.

Herein, the driving environments may include information on weather and information on a time zone of an area where the autonomous vehicle is driven, but the scope of the present disclosure is not limited thereto, and may include various information on weather in a local area or region where the autonomous vehicle is driven. Also, the information on weather may include information on weather phenomena like sunshine, rain, snow, fog, etc. and the information on the time zone may include information like day, night, etc. Also, the driving roads may include types of roads, e.g., a highway, an urban road, a tunnel, etc., where the autonomous vehicle is driven, but the scope of the present disclosure is not limited thereto, and may include various road environments where the autonomous vehicle is driven.

Also, the scene code assigning module 1200 may perform or support another device to perform a process of detecting each of the driving events, which occurs while the autonomous vehicle is driven, by referring to each of the frames and each piece of the sensing information on each of the frames, to thereby generate each of event codes, via a driving event detecting module 1220.

Herein, the event codes may include (1) frame-based event codes detected by using the consecutive frames and (2) vehicle-based event codes detected by using the sensing information.

As one example, the scene code assigning module 1200 may perform or support another device to perform a process of inputting the consecutive frames into a scene change detector of the driving event detecting module 1220, to thereby allow the scene change detector to detect whether each of the scenes of each of the consecutive frames is changed and thus generate each of the frame-based event codes corresponding to each of the frames. Herein, the frame-based event codes may include codes respectively corresponding to a uniform sample, a scene change, etc. according to whether the scenes are changed. In addition, the scene code assigning module 1200 may perform or support another device to perform a process of detecting operation states of the autonomous vehicle by using the sensing information and thus detecting events which occur while the autonomous vehicle is driven, to thereby generate vehicle-based event codes. Herein, the vehicle-based event codes may include codes respectively corresponding to a rapid steering, rapid brake slamming, normal action, AEB activated action, etc. And, the scene code assigning module 1200 may perform or support another device to perform a process of generating each of the scene codes of each of the frames by using each of the class codes of each of the frames and each of the event codes of each of the frames.

The following table may indicate each of the scene codes assigned to each of the frames.

| Class code | | Event code | |
|---|---|---|---|
| Driving environment (weather/time) | Driving road | Frame-based event code | Vehicle-based event code |
| sunshine, rain, snow, fog, etc. day/night | highway/city/tunnel | uniform sample/ scene change | rapid steering/ rapid brake slamming/ normal action/ AEB activated |

However, it should be noted that the scene codes listed in the above table are not to be taken in a limiting sense, and various types of the scene codes of the frames in the driving video can be generated.

Herein, by referring to FIG. 2 again, the driving video and the sensing information may be inputted into a driving video & driving information analyzing module 1110 of the autonomous vehicle.

Then, the driving video & driving information analyzing module 1110 may perform or support another device to perform a process of applying a learning operation to the consecutive frames of the driving video, to thereby detect information on a nearby environment of the autonomous vehicle, for example, information on objects, such as vehicles, pedestrians, etc., information on lanes, information on traffic signal of the driving road, etc. via the perception network, and a process of detecting information on the operation states of the autonomous vehicle by referring to the sensing information. And, the information on the nearby environment and the information on the operation states of the autonomous vehicle may be transmitted to an autonomous driving controlling part 1500, and the autonomous driving controlling part 1500 may control operation of the autonomous vehicle by using the information on the nearby environment and the information on the operation states.

As one example, the driving video & driving information analyzing module 1110 may perform or support another device to perform a process of detecting objects from the frames of the driving video, to thereby generate object detection information of each of the frames, via an object detector based on deep learning, for example, the object detector based on a convolutional neural network (CNN), or a process of segmenting the frames of the driving video, to thereby generate the information on the lanes on each of the frames, via a segmentation network based on deep learning. Also, the driving video & driving information analyzing module 1110 may also perform or support another device to perform a process of outputting the information on the operation states of the autonomous vehicle. Herein, the information on the operation states may include information on driving conditions of the autonomous vehicle respectively corresponding to an acceleration, a deceleration, a steering wheel operation, an activation autonomous emergency brake (AEB), etc. of the autonomous vehicle.

Next, the on-vehicle active learning device 1000 may perform or support another device to perform a process of selecting frames useful for the training data, with which the perception network of the autonomous vehicle is to be trained, by using each of the scene codes of each of the frames and the object detection information on each of the frames detected by the object detector, via a frame selecting module 1300 and a process of storing the frames, selected as the training data, in a frame storing part 1400.

That is, the on-vehicle active learning device 1000 may perform or support another device to perform a process of allowing the frame selecting module 1300 to select frames, i.e., images, which are useful for training the perception network based on deep learning of the autonomous vehicle, among the consecutive frames acquired from the driving video.

Herein, the frame selecting module 1300 may select the frames useful for training the perception network in various ways.

That is, the on-vehicle active learning device 1000 may perform or support another device to perform (i) a process of selecting a first part of the frames, whose object detection information generated during the driving events satisfies a preset condition, as specific frames to be used for training the perception network of the autonomous vehicle, via a frame selecting module 1300, by using each of the scene codes of each of the frames and the object detection information, for each of the frames, detected by an object detector and (ii) a process of storing the specific frames and their corresponding specific scene codes in a frame storing part 1400, i.e., a memory with limited capacity installed on the autonomous vehicle, such that the specific frames and their corresponding specific scene codes match with one another.

Also, the on-vehicle active learning device 1000 may perform or support another device to perform a process of selecting a second part of the frames, matching with a training policy of the perception network of the autonomous vehicle, as the specific frames among the frames by using the scene codes and the object detection information, via the frame selecting module 1300 and a process of storing the specific frames and their corresponding specific scene codes in the frame storing part 1400 such that the specific frames and their corresponding specific scene codes match with one another.

As one example, the on-vehicle active learning device 1000 may perform or support another device to perform a process of selecting a certain frame, which has a collision area where no object is detected in a collision event, as one of the specific frames useful for training the perception network by referring to the scene codes. Herein, the collision event may be a driving event performed in a situation, e.g., a sudden braking, a sudden right turn, a sudden left turn, etc., in which an operation state of the autonomous vehicle represents a traffic collision or an estimated traffic collision. For example, the collision event may include an event where braking of the autonomous vehicle occurs when a traffic collision is expected to be imminent, but the scope of the present disclosure is not limited thereto. Herein, the collision area may be an area, in the certain frame, where an object is estimated as being located if the autonomous vehicle collides with the object or where the object is estimated to be located if the autonomous vehicle is estimated to collide with the object.

That is, if an event code of the autonomous vehicle corresponds to a sudden braking, a sudden right turn, a sudden left turn, etc., an object must be detected in the collision area, however, if no object is detected in the collision area on one of the frames of the driving video, a false negative is suspected, therefore, said one of the frames may be selected as one of the specific frames useful for training the perception network.

Also, the on-vehicle active learning device 1000 may perform or support another device to perform a process of selecting a certain frame, which has the collision area where an object is detected in a normal event, as one of the specific frames useful for training the perception network by referring to the scene codes. Herein, the normal event may be an event where the autonomous vehicle is driven normally without any accidents or collisions.

That is, if the autonomous vehicle is driven normally without any accidents or collisions, etc., no object should be detected in the collision area, however, if an object is detected in the collision areas on one of the frames of the driving video, a function false alarm is suspected, therefore, said one of the frames may be selected as one of the specific frames useful for training the perception network.

Also, the on-vehicle active learning device 1000 may perform or support another device to perform a process of selecting a certain frame, where an object with its confidence score included in the object detection information equal to or lower than a preset value is located, as one of the specific frames which are useful for training the perception network.

And, for frames corresponding to situations other than the specific situations described above, the perception network is determined as properly operating on such frames, therefore, such frames may be determined as frames not useful for training the perception network and be discarded.

Meanwhile, according to a training policy of the perception network, the on-vehicle active learning device 1000 may perform or support another device to perform a process of selecting a certain frame, from which a pedestrian in a rare driving environment is detected, as one of the specific frames which are useful for training the perception network by referring to the scene codes.

As one example, in case the scene code corresponds to a rainy night, a frame where a pedestrian is detected may be determined as a hard example, that is, an example which has the degree of usefulness higher than a threshold usefulness value, to be used for training the perception network and thus said frame may be determined as useful for training the perception network. As another example, in case the scene code corresponds to a sunny day, the perception network may be determined as sufficiently trained, and therefore, said frame may be determined as not useful for training the perception network in order to avoid overfitting.

However, it should be noted that the method described above for determining whether the frames of the driving video are useful for training the perception network or not is just an example. That is, the scope of the present disclosure is not limited thereto and the method may vary by set conditions.

Meanwhile, the frame selecting module 1300 may determine whether the frames of the driving video are useful for training the perception network or not by using a trained network, i.e., a trained deep learning network.

Figure 4:
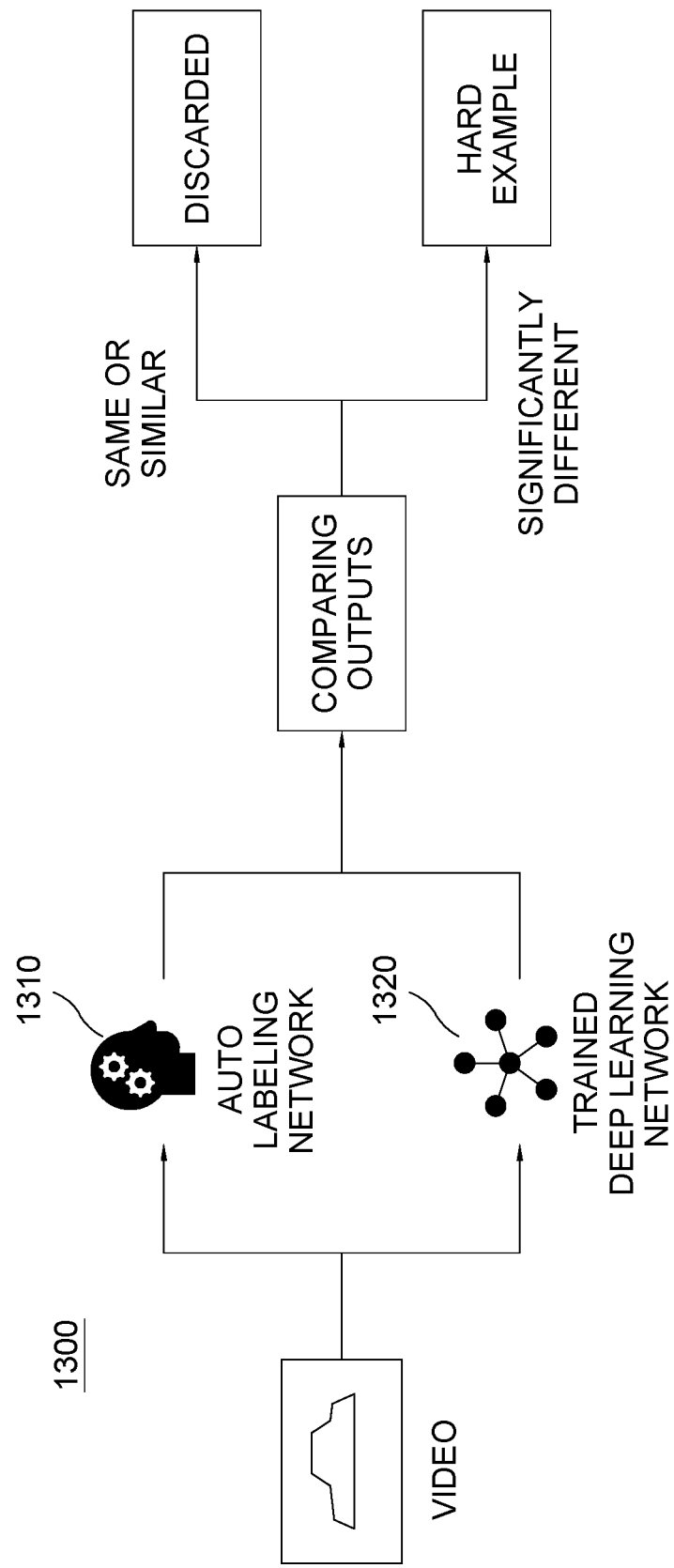
FIG. 4 is a drawing schematically illustrating a method for determining a useful frame, which has a degree of usefulness higher than a threshold usefulness value, for the on-vehicle active learning in accordance with one example embodiment of the present disclosure.

For example, by referring to FIG. 4, the frame selecting module 1300 may perform or support another device to perform a process of inputting the frames into an auto labeling network 1310 and the trained deep learning network 1320, respectively. Thereafter, by performing an output comparison, which is a process of comparing an output from the auto labeling network 1310 and an output from the trained deep learning network 1320, the frames may be determined as useful or not for training the perception network. If the outputs are identical or similar to each other, the frames may be determined as not useful. And, if a difference between the outputs is equal or greater than a predetermined value, the frames may be considered as hard examples and determined useful for training the perception network.

Figure 5:
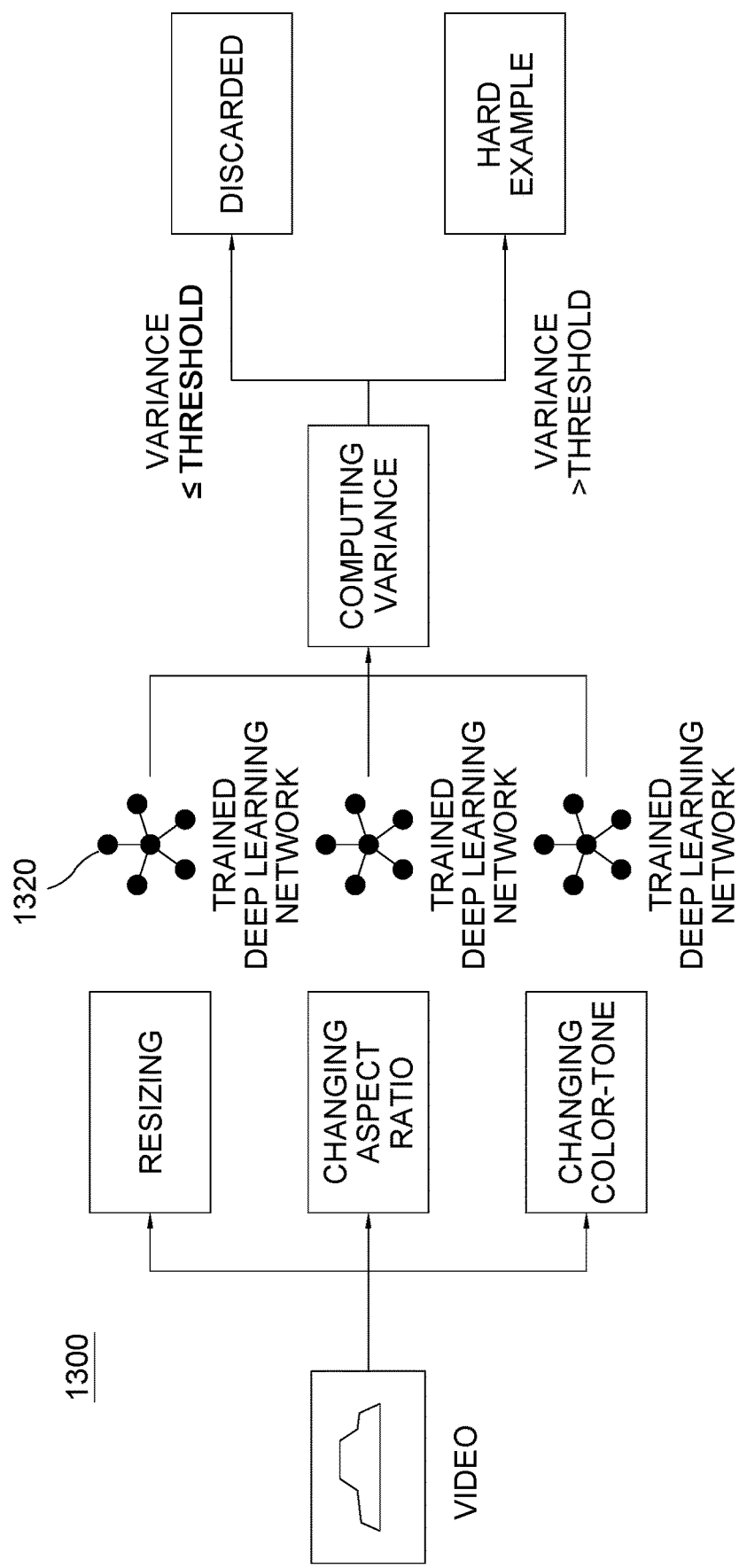
FIG. 5 is a drawing schematically illustrating another method for determining the useful frame for the on-vehicle active learning in accordance with one example embodiment of the present disclosure.

As another example, by referring to FIG. 5, the frame selecting module 1300 may perform or support another device to perform a process of modifying the frames in various ways, to thereby create various modified frames. Herein, the various ways of modifying the frames may include resizing the frames, changing aspect ratios of the frames, changing color tone of the frames, etc. And then, the frame selecting module 1300 may perform or support another device to perform a process of inputting each of the modified frames into the trained deep learning network 1320. Thereafter, by computing a variance of output values of each of the modified frames from the trained deep learning network 1320, the frames may be determined as useful or not for training the perception network. If the computed variance is equal or smaller than a preset threshold, the frames may be determined as not useful. And, if the computed variance is greater than the preset threshold, the frames may be considered as hard examples and thus determined as useful for training the perception network.

Next, the on-vehicle active learning device 1000 may perform or support another device to perform (i) a process of sampling the specific frames stored in the frame storing part 1400 by using the specific scene codes to thereby generate training data and (ii) a process of executing on-vehicle learning of the perception network of the autonomous vehicle by using the training data.

Herein, the on-vehicle active learning device 1000 may perform or support another device to perform (i) a process of under-sampling through selecting a part of the specific frames in a majority class and as many as possible of the specific frames in a minority class by referring to the scene codes or (ii) a process of over-sampling through generating copies of the specific frames in the minority class as many as the number of the specific frames in the majority class, by referring to the scene codes, at the step of sampling the specific frames stored in the frame storing part 1400, to thereby generate the training data and thus train the perception network with the sampled training data. For example, in case that the number of frames corresponding to the majority class is 100 and that the number of frames corresponding to the minority class is 10, then if a desired number of frames to be sampled is 30, ten frames corresponding to the minority class may be selected and twenty frames corresponding to the majority class may be selected.

Also, the on-vehicle active learning device 1000 may perform or support another device to perform a process of calculating one or more weight-balanced losses on the training data, corresponding to the scene codes, by weight balancing, to thereby train the perception network via backpropagation by using the weight-balanced losses, at the step of executing the on-vehicle learning of the perception network by using the specific frames stored in the frame storing part 1400.

The present disclosure has an effect of providing the method for improving an efficiency of training the perception network with new training data by performing a process of assigning the scene code corresponding to a frame of a video, a process of determining the frame as useful for training or not, and then a process of storing the data in a storage of a vehicle.

The present disclosure has another effect of providing the method for performing the on-line active learning on the vehicle itself, through sampling balancing on the training data according to the scene code.

The present disclosure has still another effect of providing the method for performing the on-vehicle learning of the perception network of the autonomous vehicle by performing the sampling balancing on the training data according to its corresponding scene code.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for on-vehicle active learning to be used for training a perception network of an autonomous vehicle, comprising steps of:
   (a) an on-vehicle active learning device, if a driving video and sensing information are acquired respectively from a camera and one or more sensors mounted on an autonomous vehicle while the autonomous vehicle is driven, performing or supporting another device to perform a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information;
   (b) the on-vehicle active learning device performing or supporting another device to perform at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
   (c) the on-vehicle active learning device performing or supporting another device to perform (c1) a process of sampling the specific frames stored in the frame storing part by using the specific scene codes to thereby generate training data and (c2) a process of executing on-vehicle learning of the perception network of the autonomous vehicle by using the training data.

2. The method of claim 1, wherein, at the step of (c), the on-vehicle active learning device performs or supports another device to perform at least one of (i) a process of under-sampling the specific frames by referring to the scene codes or a process of over-sampling the specific frames by referring to the scene codes, to thereby generate the training data and thus train the perception network, at the step of (c1) and (ii) (ii-1) a process of calculating one or more weight-balanced losses on the training data, corresponding to the scene codes, by weight balancing and (ii-2) a process of training the perception network via backpropagation using the weight-balanced losses, at the step of (c2).

3. The method of claim 1, wherein, at the step of (b), the on-vehicle active learning device performs or supports another device to perform a process of selecting a certain frame, on which no object is detected from its collision area, corresponding to a collision event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

4. The method of claim 1, wherein, at the step of (b), the on-vehicle active learning device performs or supports another device to perform a process of selecting a certain frame where an object, with its confidence score included in the object detection information equal to or lower than a preset value, is located as one of the specific frames.

5. The method of claim 1, wherein, at the step of (b), the on-vehicle active learning device performs or supports another device to perform a process of selecting a certain frame, from which a pedestrian in a rare driving environment is detected, as one of the specific frames, by referring to the scene codes.

6. A method for on-vehicle active learning to be used for training a perception network of an autonomous vehicle, comprising steps of:
   (a) an on-vehicle active learning device, if a driving video and sensing information are acquired respectively from a camera and one or more sensors mounted on an autonomous vehicle while the autonomous vehicle is driven, performing or supporting another device to perform a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information; and
   (b) the on-vehicle active learning device performing or supporting another device to perform at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
   wherein, at the step of (a), the on-vehicle active learning device performs or supports another device to perform a process of allowing the scene code assigning module to (i) apply a learning operation to each of the frames, to thereby classify each of the scenes of each of the frames into one of classes of driving environments and one of classes of driving roads and thus generate each of class codes of each of the frames, via a scene classifier based on deep learning, (ii) detect each of driving events, which occurs while the autonomous vehicle is driven, by referring to each of the frames and each piece of the sensing information on each of the frames, to thereby generate each of event codes, via a driving event detecting module, and (iii) generate each of the scene codes for each of the frames by using each of the class codes of each of the frames and each of the event codes of each of the frames.

7. The method of claim 6, wherein the on-vehicle active learning device performs or supports another device to perform a process of allowing the scene code assigning module to (i) detect one or more scene changes in the frames via the driving event detecting module and thus generate one or more frame-based event codes and (ii) detect one or more operation states, corresponding to the sensing information, of the autonomous vehicle and thus generate one or more vehicle-based event codes, to thereby generate the event codes.

8. A method for on-vehicle active learning to be used for training a perception network of an autonomous vehicle, comprising steps of:
(a) an on-vehicle active learning device, if a driving video and sensing information are acquired respectively from a camera and one or more sensors mounted on an autonomous vehicle while the autonomous vehicle is driven, performing or supporting another device to perform a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information; and
(b) the on-vehicle active learning device performing or supporting another device to perform at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
wherein, at the step of (b), the on-vehicle active learning device performs or supports another device to perform a process of selecting a certain frame, on which an object is detected from its collision area, corresponding to a normal event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

9. An on-vehicle active learning device for on-vehicle active learning to be used for training a perception network of an autonomous vehicle, comprising:
at least one memory that stores instructions; and
at least one processor configured to execute the instructions to perform or support another device to perform:
(I) if a driving video and sensing information are acquired respectively from a camera and one or more sensors mounted on an autonomous vehicle while the autonomous vehicle is driven, a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information and (II) at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
wherein the processor further performs or supports another device to perform:
(III) (III-1) a process of sampling the specific frames stored in the frame storing part by using the specific scene codes to thereby generate training data and (III-2) a process of executing on-vehicle learning of the perception network of the autonomous vehicle by using the training data.

10. The on-vehicle active learning device of claim 9, wherein, at the process of (III), the processor performs or supports another device to perform at least one of (i) a process of under-sampling the specific frames by referring to the scene codes or a process of over-sampling the specific frames by referring to the scene codes, to thereby generate the training data and thus train the perception network, at the process of (III-1) and (ii) (ii-1) a process of calculating one or more weight-balanced losses on the training data, corresponding to the scene codes, by weight balancing and (ii-2) a process of training the perception network via backpropagation using the weight-balanced losses, at the process of (III-2).

11. The on-vehicle active learning device of claim 9, wherein, at the process of (II), the processor performs or supports another device to perform a process of selecting a certain frame, on which no object is detected from its collision area, corresponding to a collision event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

12. The on-vehicle active learning device of claim 9, wherein, at the process of (II), the processor performs or supports another device to perform a process of selecting a certain frame where an object, with its confidence score included in the object detection information equal to or lower than a preset value, is located as one of the specific frames.

13. The on-vehicle active learning device of claim 9, wherein, at the process of (II), the processor performs or supports another device to perform a process of selecting a certain frame, from which a pedestrian in a rare driving environment is detected, as one of the specific frames, by referring to the scene codes.

14. An on-vehicle active learning device for on-vehicle active learning to be used for training a perception network of an autonomous vehicle, comprising:
   at least one memory that stores instructions; and
   at least one processor configured to execute the instructions to perform or support another device to perform:
      (I) if a driving video and sensing information are acquired respectively from a camera and one or more sensors mounted on an autonomous vehicle while the autonomous vehicle is driven, a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information and (II) at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
   wherein, at the process of (I), the processor performs or supports another device to perform a process of allowing the scene code assigning module to (i) apply a learning operation to each of the frames, to thereby classify each of the scenes of each of the frames into one of classes of driving environments and one of classes of driving roads and thus generate each of class codes of each of the frames, via a scene classifier based on deep learning, (ii) detect each of driving events, which occurs while the autonomous vehicle is driven, by referring to each of the frames and each piece of the sensing information on each of the frames, to thereby generate each of event codes, via a driving event detecting module, and (iii) generate each of the scene codes for each of the frames by using each of the class codes of each of the frames and each of the event codes of each of the frames.

15. The on-vehicle active learning device of claim 14, wherein the processor performs or supports another device to perform a process of allowing the scene code assigning module to (i) detect one or more scene changes in the frames via the driving event detecting module and thus generate one or more frame-based event codes and (ii) detect one or more operation states, corresponding to the sensing information, of the autonomous vehicle and thus generate one or more vehicle-based event codes, to thereby generate the event codes.

16. An on-vehicle active learning device for on-vehicle active learning to be used for training a perception network of an autonomous vehicle, comprising:
   at least one memory that stores instructions; and
   at least one processor configured to execute the instructions to perform or support another device to perform:
      (I) if a driving video and sensing information are acquired respectively from a camera and one or more sensors mounted on an autonomous vehicle while the autonomous vehicle is driven, a process of inputting one or more consecutive frames of the driving video and the sensing information into a scene code assigning module, to thereby allow the scene code assigning module to generate each of one or more scene codes including information on each of scenes in each of the frames and information on one or more driving events by referring to the frames and the sensing information and (II) at least one of (i) a process of selecting a first part of the frames, whose object detection information generated during the driving events satisfies a preset condition, as specific frames to be used for training the perception network of the autonomous vehicle by using each of the scene codes of each of the frames and the object detection information, for each of the frames, detected by an object detector and a process of storing the specific frames and their corresponding specific scene codes in a frame storing part such that the specific frames and their corresponding specific scene codes match with one another and (ii) a process of selecting a second part of the frames, matching with a training policy of the perception network of the autonomous vehicle, as the specific frames by using the scene codes and the object detection information and a process of storing the specific frames and their corresponding specific scene codes in the frame storing part such that the specific frames and their corresponding specific scene codes match with one another; and
   wherein, at the process of (II), the processor performs or supports another device to perform a process of selecting a certain frame, on which an object is detected from its collision area, corresponding to a normal event, as one of the specific frames by referring to the scene codes, wherein the collision area is an area, in the certain frame, where an object is estimated as being located if the autonomous vehicle collides with the object or where the object is estimated to be located if the autonomous vehicle is estimated to collide with the object.

* * * * *